United States Patent
Ushigami et al.

(10) Patent No.: US 12,180,558 B2
(45) Date of Patent: Dec. 31, 2024

(54) METHOD FOR MANUFACTURING GRAIN-ORIENTED ELECTRICAL STEEL SHEET

(71) Applicant: NIPPON STEEL CORPORATION, Tokyo (JP)

(72) Inventors: Yoshiyuki Ushigami, Tokyo (JP); Shuichi Nakamura, Tokyo (JP); Hiroyasu Fujii, Tokyo (JP); Norikazu Fujii, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 175 days.

(21) Appl. No.: 17/422,695

(22) PCT Filed: Jan. 16, 2020

(86) PCT No.: PCT/JP2020/001182
§ 371 (c)(1),
(2) Date: Jul. 13, 2021

(87) PCT Pub. No.: WO2020/149341
PCT Pub. Date: Jul. 23, 2020

(65) Prior Publication Data
US 2022/0098694 A1   Mar. 31, 2022

(30) Foreign Application Priority Data
Jan. 16, 2019 (JP) .................... 2019-005060

(51) Int. Cl.
*C21D 9/46* (2006.01)
*C21D 8/12* (2006.01)
(Continued)

(52) U.S. Cl.
CPC ............ *C21D 9/46* (2013.01); *C21D 8/1222* (2013.01); *C21D 8/1233* (2013.01);
(Continued)

(58) Field of Classification Search
CPC ...... C21D 9/46; C21D 8/1222; C21D 8/1233; C21D 8/1255; C21D 8/1261;
(Continued)

(56) References Cited

U.S. PATENT DOCUMENTS

| 3,785,882 A | 1/1974 | Jackson |
| 4,750,949 A | 6/1988 | Kobayashi et al. |

(Continued)

FOREIGN PATENT DOCUMENTS

| CN | 108699621 A | 10/2018 |
| EP | 1 464 712 A1 | 10/2004 |

(Continued)

OTHER PUBLICATIONS

Ushigami Yoshiyuki, et.al. [JP2002060843] [Machine Translation] (Year: 2002).*

(Continued)

*Primary Examiner* — Brian D Walck
*Assistant Examiner* — Nazmun Nahar Shams
(74) *Attorney, Agent, or Firm* — Birch, Stewart, Kolasch & Birch, LLP (57) ABSTRACT

A method for manufacturing a grain-oriented electrical steel sheet includes: a silicon steel material production process of producing a silicon steel material; a hot rolling process of obtaining a hot rolled sheet by subjecting the silicon steel material to hot rolling; a cold rolling process of obtaining a steel sheet of a final sheet thickness by subjecting the hot rolled sheet to a single cold rolling process or multiple cold rolling processes having intermediate annealing performed between the cold rolling processes; a decarburization annealing process of subjecting the steel sheet to decarburization annealing; and a final annealing process of applying (Continued)

an annealing separator containing alumina as a main component to the steel sheet and subjecting the steel sheet to final annealing.

11 Claims, 1 Drawing Sheet

(51) Int. Cl.
    *C22C 38/00*     (2006.01)
    *C22C 38/02*     (2006.01)
    *C22C 38/04*     (2006.01)
    *C22C 38/06*     (2006.01)
    *C22C 38/42*     (2006.01)
    *C22C 38/44*     (2006.01)
    *C22C 38/46*     (2006.01)
    *C22C 38/48*     (2006.01)
    *C22C 38/50*     (2006.01)
    *C22C 38/54*     (2006.01)
    *C22C 38/60*     (2006.01)

(52) U.S. Cl.
    CPC ......... *C21D 8/1255* (2013.01); *C21D 8/1261* (2013.01); *C21D 8/1266* (2013.01); *C21D 8/1272* (2013.01); *C21D 8/1283* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/60* (2013.01); *C21D 2201/05* (2013.01)

(58) Field of Classification Search
    CPC ................ C21D 8/1266; C21D 8/1272; C21D 8/1283; C22C 38/001; C22C 38/02; C22C 38/04
See application file for complete search history.

(56) References Cited

U.S. PATENT DOCUMENTS

| | | | |
|---|---|---|---|
| 2002/0038678 | A1 | 4/2002 | Ushigami et al. |
| 2009/0032142 | A1* | 2/2009 | Kumano ............... C21D 8/1272 148/111 |
| 2014/0202599 | A1 | 7/2014 | Watanabe et al. |
| 2014/0338784 | A1 | 11/2014 | Shingaki et al. |
| 2015/0170813 | A1 | 6/2015 | Shingski et al. |
| 2015/0187473 | A1 | 7/2015 | Imamura et al. |
| 2018/0237876 | A1* | 8/2018 | Hecht ..................... C22C 38/02 |
| 2019/0271054 | A1 | 9/2019 | Ehashi et al. |

FOREIGN PATENT DOCUMENTS

| | | |
|---|---|---|
| EP | 2 599 883 A1 | 6/2013 |
| JP | 58-26405 B2 | 6/1983 |
| JP | 62-86175 A | 4/1987 |
| JP | 64-83620 A | 3/1989 |
| JP | 7-118750 A | 5/1995 |
| JP | 2002-60843 A | 2/2002 |
| JP | 2003-41320 A | 2/2003 |
| JP | 2003-268452 A | 9/2003 |
| JP | 4331886 B2 | 9/2009 |
| RU | 2 553 789 C1 | 6/2015 |
| RU | 2 572 947 C2 | 1/2016 |
| RU | 2 595 190 C1 | 8/2016 |
| RU | 2 597 464 C2 | 9/2016 |

OTHER PUBLICATIONS

Ushigami Yoshiyuki, et.al. [JP2017106057A] [Machine Translation] (Year: 2017).*

Ushigami Yoshiyuki, et.al. [JP2002332523A] [Machine Translation, hereafter Yoshiyuki'523] (Year: 2002).*

* cited by examiner

METHOD FOR MANUFACTURING GRAIN-ORIENTED ELECTRICAL STEEL SHEET

TECHNICAL FIELD

The present invention relates to a method for manufacturing a grain-oriented electrical steel sheet.

Priority is claimed on Japanese Patent Application No. 2019-005060, filed Jan. 16, 2019, the content of which is incorporated herein by reference.

BACKGROUND ART

Grain-oriented electrical steel sheets are soft magnetic materials and are mainly used as iron core materials for transformers. For this reason, grain-oriented electrical steel sheets are required to have magnetic properties such as high magnetization characteristics and a low iron loss. Magnetization characteristics include magnetic flux densities induced when an iron core is excited. When magnetic flux densities increase, sizes of iron cores can be reduced, which is advantageous in terms of device constitutions of transformers and also in terms of the manufacturing costs of transformers.

In order to improve magnetization characteristics, it is necessary to control a texture to the crystal orientation (Goss orientation) in which the {110} plane is aligned parallel to the steel sheet surface and the <100> axis is aligned with the rolling direction.

In order to accumulate crystal orientations in the Goss orientation, in general, the inhibitors such as AlN, MnS, and MnSe are finely precipitated in steel, and thereby, the secondary recrystallization is controlled.

Also, as magnetic properties, a high magnetic flux density (represented by a magnetic flux density B8 value when a magnetic field of 800 A/m is applied) and a low iron loss (represented by an energy loss $W_{17/50}$ (W/kg) with a magnetic flux density of 1.7 teslas (T) at a frequency of 50 hertz (Hz)) are required.

Iron loss is an electric power loss consumed as heat energy when iron cores are excited by an alternating-current magnetic fields. In view of energy saving, iron loss is required to be as low as possible. A level of iron loss is influenced by the magnetic susceptibility, sheet thickness, film tension, amount of impurities, electrical resistivity, grain size, magnetic domain size, and the like. Now that various technologies for electrical steel sheets have been developed, research and development to reduce iron loss are continuously performed to improve energy efficiency.

Patent Document 1 (Japanese Examined Patent Application, Second Publication No. S58-26405) discloses a method for reducing iron loss by irradiating a steel sheet which has been subjected to final annealing with a laser beam to provide local minute strain to the steel sheet so that a magnetic domain is subdivided when an electrical steel sheet is used as a laminated iron core.

Also, Patent Document 2 (Japanese Unexamined Patent Application, First Publication No. S62-86175) discloses a method in which the magnetic domain refinement effect does not disappear even if an electrical steel sheet has been subjected to processing to iron core and then subjected to stress relief annealing when an electrical steel sheet is used as a wound iron core. When a magnetic domain is subdivided using these technical means, iron loss is significantly reduced.

However, when the inventors of the present invention observed the movement of the magnetic domain when the magnetic domain was subdivided as described above, it was found that there were some magnetic domains which did not move. Thus, the inventors of the present invention have come to the recognition that, in order to further reduce an iron loss value of a grain-oriented electrical steel sheet, eliminating the pinning effect which hinders the movement of the magnetic domain caused by a glass film on a surface of the steel sheet is important as well as subdividing the magnetic domain.

In order to facilitate the movement of the magnetic domain as described above, it is effective not to form a glass film on the surface of a steel sheet. As a means for this. Patent Document 3 (Specification of U.S. Pat. No. 3,785,882) discloses a method for preventing a glass film from being formed on a surface of a steel sheet using coarse high-purity alumina as an annealing separator. However, this method cannot eliminate inclusions directly below a surface and a margin of improvement in iron loss is only 2% at most at $W_{15/60}$.

Patent Document 4 (Japanese Unexamined Patent Application, First Publication No. S64-83620) discloses a method for performing chemical polishing or electrolytic polishing after final annealing as a method for controlling inclusions directly below a surface and achieving mirror finishing of the surface. However, although it is possible to process a sample material at a laboratory level using a method such as chemical polishing and electrolytic polishing, in order to carry out the above method on an industrial scale, the problems concerning managing of a concentration and a temperature of a chemical solution and installing of a pollution control facility or the like need to be resolved. Furthermore, in view of productivity, it is very difficult to put the above method into practical use.

As a method for resolving this problem. Patent Document 5 (Japanese Unexamined Patent Application, First Publication No. H07-118750) discloses a method in which decarburization annealing is performed in an atmosphere gas having an oxidation degree at which Fe-based oxides ($Fe_2SiO_4$, FeO, and the like) are not formed and alumina is used as an annealing separator between sheets. However, even if this process were to be carried out industrially, it can be seen that it would be difficult to obtain good magnetic properties while decarburization is stably performed.

PRIOR ART DOCUMENT

Patent Document

[Patent Document 1]
Japanese Examined Patent Application, Second Publication No. S58-026405
[Patent Document 2]
Japanese Unexamined Patent Application, First Publication No. S62-86175
[Patent Document 3]
Specification of U.S. Pat. No. 3,785,882
[Patent Document 4]
Japanese Unexamined Patent Application, First Publication No. S64-083620
[Patent Document 5]
Japanese Unexamined Patent Application. First Publication No. H07-118750

SUMMARY OF THE INVENTION

Problems to be Solved by the Invention

The present invention was made in view of the above-described problems and an object of the prevent invention is to provide a method for manufacturing a grain-oriented electrical steel sheet having good magnetic properties while satisfactorily performing decarburization in decarburization annealing.

Means for Solving the Problem (1) A method for manufacturing a grain-oriented electrical steel sheet according to an aspect of the present invention includes: a silicon steel material production process of producing a silicon steel material; a hot rolling process of obtaining a hot rolled sheet by subjecting the silicon steel material to hot rolling; a cold rolling process of obtaining a steel sheet of a final sheet thickness by subjecting the hot rolled sheet to a single cold rolling process or multiple cold rolling processes having intermediate annealing performed between the cold rolling processes; a decarburization annealing process of subjecting the steel sheet to decarburization annealing; and a final annealing process of applying an annealing separator containing alumina as a main component to the steel sheet and subjecting the steel sheet to final annealing, wherein the silicon steel material contains: in terms of mass %, Si: 0.8 to 7.0%; C: 0.085% or less; acid-soluble Al: 0.010 to 0.065%; N: 0.004 to 0.012%; Mn: 1.00% or less; S: 0.050% or less; a total of 0.01 to 0.20% of one or both of Sn and Sb; and the remainder: Fe and impurities.

(2) In the method for manufacturing a grain-oriented electrical steel sheet according to (1), the decarburization annealing process may include: performing the decarburization annealing using a decarburization annealing furnace including a heating area and a soaking area, an oxidation degree P1 of an atmosphere gas in the heating area may satisfy the following Expression 1, and an oxidation degree P2 of an atmosphere gas in the soaking area may satisfy the following Expression 2:

$$0.01 \leq P1 \leq 0.15 \quad \text{(Expression 1); and}$$

$$0.01 \leq P2 \leq 0.15 \quad \text{(Expression 2)}.$$

(3) In the method for manufacturing a grain-oriented electrical steel sheet according to (1) or (2), the silicon steel material may further contain, in terms of mass %, Cr: 0.02 to 0.50%.

(4) In the method for manufacturing a grain-oriented electrical steel sheet according to (2) or (3), the P1 and the P2 described above may satisfy the following Expression 3:

$$P1 > P2 \quad \text{(Expression 3)}.$$

(5) In the method for manufacturing a grain-oriented electrical steel sheet according to any one of (1) to (4), the silicon steel material may further contain, in terms of mass %, Cu: 0% or more and 0.4% or less; P: 0% or more and 0.5% or less; Ni: 0% or more and 1.0% or less; B: 0% or more and 0.008% or less; V: 0% or more and 0.15% or less; Nb: 0% or more and 0.20% or less; Mo: 0% or more and 0.10% or less; H: 0% or more and 0.015% or less; and Bi: 0% or more and 0.010% or less.

(6) In the method for manufacturing a grain-oriented electrical steel sheet according to any one of (1) to (5), the method for manufacturing a grain-oriented electrical steel sheet may further include: a nitriding treatment process from before the decarburization annealing process to before secondary recrystallization initiation in the final annealing process.

(7) In the method for manufacturing a grain-oriented electrical steel sheet according to any one of (1) to (6), the method for manufacturing a grain-oriented electrical steel sheet may further include: a hot-band annealing process of subjecting the hot rolled sheet obtained in the hot rolling process to annealing after the hot rolling process and before the cold rolling process.

Effects of the Invention

According to the above aspect of the present invention, it is possible to provide a method for manufacturing a grain-oriented electrical steel sheet having good magnetic properties while satisfactorily performing decarburization in decarburization annealing.

EMBODIMENTS FOR IMPLEMENTING THE INVENTION

Although the above-described research has been conducted to improve magnetic properties of grain-oriented electrical steel sheets in the related art, there are still issues such as those mentioned above which need to be resolved.

The inventors of the present invention have conducted various experiments to resolve such problems. As a result, it is found that, when an appropriate amount of Sn and/or Sb is included as steel components, a grain-oriented electrical steel sheet having good magnetic properties can be manufactured while satisfactorily performing decarburization. Furthermore, it is found that the above effect was improved by controlling oxidation degrees ($P_{H2O}/P_{H2}$) of atmosphere gases in a heating area and a soaking area of a decarburization annealing process.

Preferred embodiments of the present invention will be described below. Here, it is obvious that the present invention is not limited to the constitutions disclosed in these embodiments and various modifications are possible without departing from the gist of the present invention.

It is also obvious that the independent elements of the following embodiments can be combined with each other within the scope of the present invention.

Also, in the following embodiments, a numerically limited range includes a lower limit value and an upper limit value. However, numerical values indicated using the term "exceeding" and the expression "less than" are not included in this numerical range.

In addition, unless otherwise specified, of a chemical component in the following embodiments means "mass %".

A method for manufacturing a grain-oriented electrical steel sheet according to an embodiment of the present invention will be described below.

A method for manufacturing a grain-oriented electrical steel sheet according to the following embodiments includes: a silicon steel material production process of producing a silicon steel material; a hot rolling process of obtaining a hot rolled sheet by subjecting the silicon steel material to hot rolling; a cold rolling process of obtaining a steel sheet of a final sheet thickness by subjecting the hot rolled sheet to a single cold rolling process or multiple cold rolling processes having intermediate annealing performed between cold rolling processes; a decarburization annealing process of subjecting the steel sheet to decarburization annealing; and a final annealing process of applying an annealing separator having alumina as a main component to the steel sheet and subjecting the steel sheet to final annealing, in which the silicon steel material contains, in terms of mass %, Si: 0.8 to 7.0%; C: 0.085% or less; acid-soluble Al: 0.010 to 0.065%; N: 0.004 to 0.012%; Mn: 1.00% or less; S: 0.050% or less; a total of 0.01 to 0.20% of one or both of Sn and Sb; and the remainder: Fe and impurities. Furthermore, in the method for manufacturing a grain-oriented electrical steel sheet according to the above-described embodiment, a hot-band annealing process of subjecting the hot rolled sheet which has been obtained in the hot rolling process to annealing may be further provided after the hot rolling process and before the cold rolling process.

[Chemical Components of Silicon Steel Material]

If the Si content increases, the electrical resistance increases and iron loss characteristics are improved. However, if the Si content exceeds 7.0%, cold rolling is extremely difficult and a steel material may crack during rolling. For this reason, an upper limit of the Si content is 7.0%. The upper limit of the Si content is preferably 4.5%, and more preferably 4.0%.

Also, if the Si content is less than 0.8%, γ transformation occurs during final annealing and a crystal orientation of a steel sheet is impaired. For this reason, a lower limit of the Si content is 0.8%. The lower limit of the Si content is preferably 2.0%, and more preferably 2.5%.

C is an element which is effective in controlling a primary recrystallization structure, but adversely affects the magnetic properties. Thus, C needs to be removed by performing a decarburization process before final annealing.

If the C content of the silicon steel material is more than 0.085%, a decarburization annealing time increases and the productivity in industrial production is impaired. For this reason, an upper limit of the C content is 0.085%. The upper limit of the C content is more preferably 0.070%.

In the method for manufacturing a grain-oriented electrical steel sheet according to this embodiment, acid-soluble Al is an essential element for functioning as an inhibitor as (Al, Si)N by binding with N. The acid-soluble Al content is 0.010 to 0.065% in which secondary recrystallization is stable.

A lower limit of the acid-soluble Al content is preferably 0.020%, and more preferably 0.025%. An upper limit of the acid-soluble Al content is preferably 0.040%, and more preferably 0.030%.

If the N content exceeds 0.012%, voids called blisters occur in a steel sheet during cold rolling. Thus, it is desirable that the N content do not exceed 0.012%. Furthermore, in order to bind with Al and function as an inhibitor, the N content needs to be 0.004% or more. A lower limit of the N content is preferably 0.006%, and more preferably 0.007%. An upper limit of the N content is preferably 0.010%, and more preferably 0.009%.

It is desirable that Mn and S be added within a range such that Mn/(S+Se)≥4 is satisfied in view of preventing the occurrence of cracks in hot rolling. If the Mn content increases, a saturation magnetic flux decreases. Thus, the Mn content is preferably 1.00% or less. The S content is preferably 0.050% or less, more preferably 0.015% or less, still more preferably 0.010% or less, and still yet more preferably 0.007% or less.

Also, a part of S can be partially replaced with Se. For this reason, when Se is included, S+Se: 0.050% or less is preferable and it is desirable that a range be set to satisfy Mn/(S+Se)≥4.

Mn and S may be utilized as inhibitors for secondary recrystallization in some cases. In these cases, the Mn content at which stable secondary recrystallization is provided is within the range of 0.02 to 0.30%. A lower limit of the Mn content is preferably 0.05%, and more preferably 0.07%. An upper limit of the Mn content is preferably 0.15%, and more preferably 0.10%. Furthermore, in this case, the preferred S content is within the range of 0.010 to 0.050%. The S content is preferably 0.015% or more, and more preferably 0.020% or more. The S content is more preferably 0.040% or less. In addition, S can also be replaced with Se.

In the manufacturing method of Taguchi, Sakakura et al. (for example, Japanese Examined Patent Application, Second Publication No. S40-15644), Mn and S are utilized as inhibitors for secondary recrystallization. On the other hand, in the manufacturing method of Komatsu et al. (for example, Japanese Examined Patent Application, Second Publication No. S62-45285), Mn and S are not utilized as inhibitors for secondary recrystallization.

Sn and Sb are well-known grain boundary segregation elements. Also in a grain-oriented electrical steel sheet, until now, it has been known that, Sb and Sn enhance the sealing properties of the surface and prevent oxidation in a high dew point atmosphere, but it has not been known that Sb and Sn promote decarburization in a low dew point atmosphere.

In order to obtain the decarburization promoting effect of Sn and/or Sb, it is necessary to contain one or both of Sn and Sb in a total amount of 0.01% or more. A lower limit of the total content of Sn and/or Sb is preferably 0.03%, and more preferably 0.05%. An upper limit of the total content of Sn and/or Sb is 0.20%. Even if a total of Sn and/or Sb to be contained exceeds 0.20%, the decarburization promoting effect is substantially saturated.

Cr is an element which has an influence on an oxide layer formation behavior in decarburization annealing, improves decarburization properties, and promotes subsequent surface smoothing. For this reason, Cr may be contained. When Cr is contained, the Cr content is preferably 0.02 to 0.50% in which the effect of improving decarburization properties is obtained. More preferably, a lower limit of the Cr content is 0.05%. In addition, an upper limit of the Cr content is more preferably 0.39%.

Also, in this embodiment, the silicon steel material may contain a selective element in addition to the above-described basic elements and impurities. For example, instead of a part of Fe which is the remainder described above, one or more selective elements selected from the group consisting of Cu, P, Ni, B, V, Nb, Mo, Ti, and Bi may be contained.

These selective elements may be contained in accordance with the purpose thereof. Thus, it is not necessary to limit the lower limits of these selective elements and the lower limits may be 0%. Furthermore, even if these selective elements are contained as impurities, the above effects are not impaired.

Cu: 0% or more and 0.4% or less

Copper (Cu) is an element which is effective in increasing electric resistance and reducing iron loss. Therefore, Cu may be contained within the range of the content of 0.4% or less. If the Cu content exceeds 0.4%, the effect of reducing iron loss is saturated and it may cause a surface defect called a "copper scab" during hot rolling in some cases. A lower limit of the Cu content is preferably 0.05%, and more preferably 0.1%. An upper limit of the Cu content is preferably 0.3%, and more preferably 0.2%.

P: 0% or more and 0.5% or less

Phosphorus (P) is an element which is effective in increasing electric resistance and reducing iron less. Therefore, P may be contained within the range of the content of 0.5% or less. If the P content exceeds 0.5%, there may be a problem in the reliability of a silicon steel sheet in some cases. A lower limit of the P content is preferably 0.005%, and more preferably 0.01%. An upper limit of the P content is preferably 0.2%, and more preferably 0.15%.

Ni: 0% or more and 1.0% or less

Nickel (Ni) is an element which is effective in increasing electric resistance and reducing iron loss. Furthermore, Ni is an effective element for controlling a metallographic structure of a hot rolled sheet and improving magnetic properties. Therefore, Ni may be contained within the range of the content of 1.0% or less. If the Ni content exceeds 1.0%, secondary recrystallization may be unstable in some cases. A lower limit of the Ni content is preferably 0.01%, and more preferably 0.02%. An upper limit of the Ni content is preferably 0.2%, and more preferably 0.1%.

B: 0% or more and 0.008% or less

Boron (B) is an element which is effective for exerting an inhibitor effect as BN. Therefore, B may be contained within the range of the content of 0.008% or less. If the B content exceeds 0.008%, there is a concern concerning deterioration of magnetic properties. A lower limit of the B content is preferably 0.0005%, and more preferably 0.001%. An upper limit of the B content is preferably 0.005%, and more preferably 0.003%.

V: 0% or more and 0.15% or less

Nb: 0% or more and 0.20% or less

Ti: 0% or more and 0.015% or less

Vanadium (V), niobium (Nb), and titanium (Ti) are elements which are effective for functioning as inhibitors by landing with N or C. Therefore, V, Nb, and/or Ti may be contained within the ranges of the content of 0.15% or less, 0.20% or less, and/or 0.015% or less, respectively. If these elements remain in a final product and the V content exceeds 0.15%, the Nb content exceeds 0.20%, or the Ti content exceeds 0.015%, there is a concern concerning deterioration of magnetic properties.

A lower limit of the V content is preferably 0.002%, and more preferably 0.01%. An upper limit of the V content is preferably 0.10%, and more preferably 0.05%.

A lower limit of the Nb content is preferably 0.005%, and more preferably 0.02%. An upper limit of the Nb content is preferably 0.10%, and more preferably 0.08%.

A lower limit of the H content is preferably 0.002%, and more preferably 0.004%. An upper limit of the T1 content is preferably 0.010%, and more preferably 0.008%.

Mo: 0% or more and 0.10% or less

Molybdenum (Mo) is also an effective element for increasing electric resistance and reducing iron loss. Therefore, Mo may be contained within the range of 0.10% or less. If the Mo content exceeds 0.10%, a problem may occur in the rollability of the steel sheet in some cases. A lower limit of the Mo content is preferably 0.005%, and more preferably 0.01%. An upper limit of the Mo content is preferably 0.08%, and more preferably 0.05%.

Bi: 0% or more and 0.010% or less

Bismuth (Bi) is an element which is effective for stabilizing precipitates such as sulfide and strengthening a function as an inhibitor. Therefore, Bi may be contained within the range of 0.010% or less. If the Bi content exceeds 0.010%, the magnetic properties may deteriorate in some cases. A lower limit of the Bi content is preferably 0.001%, and more preferably 0.002%. An upper limit of the Bi content is preferably 0.008%, and more preferably 0.006%.

[Method for Manufacturing Grain-Oriented Electrical Steel Sheet]

In order to manufacture a grain-oriented electrical steel sheet having a texture developed in a {110} <001> orientation from the silicon steel material having the above-described chemical composition, the following steps are performed.

Figure 1:
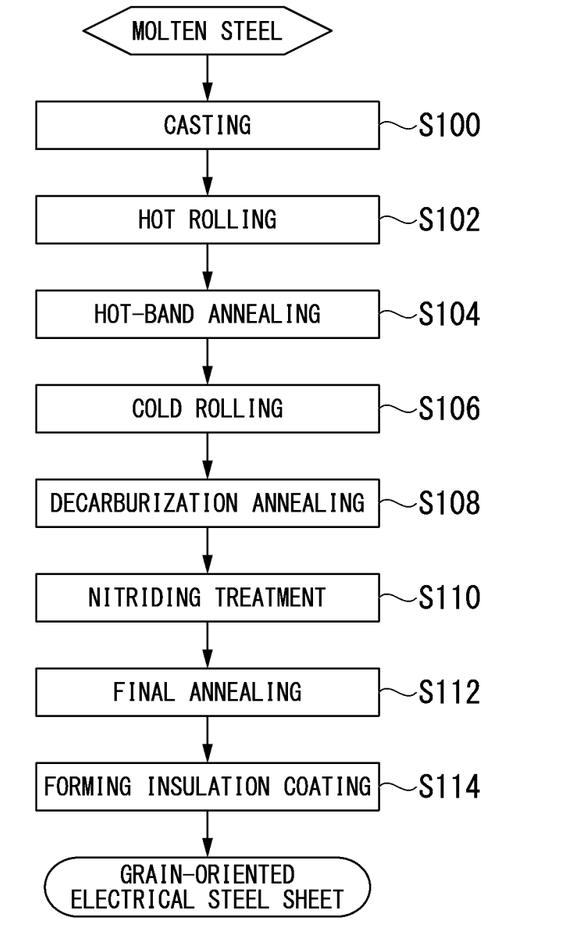
FIG. 1 is a flowchart for explaining a method for manufacturing a grain-oriented electrical steel sheet according to an embodiment of the present invention.

First, molten steel having the above-described chemical component is cast (S100) to obtain a silicon steel material and a hot rolled sheet obtained from this silicon steel material using a normal hot rolling step (S102). Alternatively, instead of the hot rolling step (S102), molten steel may be continuously cast to form a thin strip.

The hot rolled sheet or the continuously cast thin strip is subjected to the cold rolling step (S106) immediately or after the hot-band annealing step (S104).

The annealing in the hot-band annealing step (S104) may be performed within a temperature range of 750 to 1200° C. for 30 seconds to 30 minutes.

The hot-band annealing step is effective for enhancing the magnetic properties of a product. The presence or absence of the hot-band annealing step may be determined in accordance with the properties and the manufacturing costs required for the grain-oriented electrical steel sheet to be finally manufactured and the hot-band annealing step may be omitted.

The cold rolling in the cold rolling step (S106) is performed once or through multiple cold rolling steps having annealing performed between the cold rolling steps. When a single cold rolling step is performed, the rolling reduction is preferably 80% or more. Furthermore, when the multiple cold rolling steps having annealing performed between the cold rolling steps are performed, the rolling reduction of the final cold rolling after the last annealing is more preferably 80% or more. A cold rolled sheet obtained through this step is a steel sheet having a final sheet thickness.

The material which has been subjected to cold rolling is subjected to the decarburization annealing step (S108) to remove carbon contained in the steel.

In the method for manufacturing a grain-oriented electrical steel sheet according to this embodiment, in the decarburization annealing step (S108), decarburization annealing is performed in a moist hydrogen atmosphere. Annealing is performed by controlling an atmosphere gas in the decarburization annealing step (S108) to an oxidation degree at which iron (Fe)-based oxide is not formed.

In the decarburization annealing step (S108), when decarburization annealing is performed using a decarburization annealing furnace including a heating area and a soaking area, it is desirable that an oxidation degree P1 of an atmosphere gas in the heating area satisfy the following Expression 1:

$$0.01 \leq P1 \leq 0.15 \qquad \text{(Expression 1)}.$$

It is desirable that an oxidation degree P2 of an atmosphere gas in the soaking area in the decarburization annealing step (S108) satisfy the following Expression 2:

$$0.01 \leq P2 \leq 0.15 \qquad \text{(Expression 2)}.$$

The oxidation degree P1 and the oxidation degree P2 are oxidation degrees represented by a ratio "$P_{H2O}/P_{H2}$" of a partial pressure of water vapor to a partial pressure of hydrogen in an atmosphere gas containing hydrogen, nitrogen, and water vapor.

When the oxidation degree P1 of the atmosphere gases in the heating area and the oxidation degree P2 in the decarburization annealing step (S108) are defined using the foregoing Expressions 1 and 2, it is considered that Sn and/or Sb segregates on the surface during heating to alter an initial oxide film on the outermost surface and the decaiburization properties are improved.

In order to apply an annealing separator containing alumina as a main component in a subsequent process, to laminate a steel sheet, and to smooth a surface of the steel sheet which has been subjected to a final annealing, it is desirable to perform annealing at an oxidation degree at which Fe-based oxides ($Fe_2SiO_4$, FeO, and the like) are not formed in this decarburization annealing. For example, in a temperature range of 800 to 850° C. in which decarburization annealing is normally performed, it is possible to suppress the formation of Fe-based oxides by adjusting the oxidation degree P1 of the atmosphere gas in the heating area and the oxidation degree P2 of the atmosphere gas in the soaking area to 0.15 or less.

When the oxidation degree P1 or the oxidation degree P2 are greater than 0.15, inclusions are generated below a surface of a product, which hinders the reduction of iron loss. Here, if any of the oxidation degrees decreases too much, a decarburization rate will decrease. When both of these are taken into account, in this temperature range, the oxidation degree P1 and the oxidation degree P2 ($P_{H2O}/P_{H2}$) are preferably within the range of 0.01 to 0.15.

Also, in view of that carbon is further reduced and even better iron loss can be obtained in the decarburization annealing process, it is more desirable that the oxidation degree P1 of the atmosphere gas in the heating area and the oxidation degree P2 of the atmosphere gas in the soaking area satisfy the following Expression 4:

$$P1 > P2 \quad \text{(Expression 3)}.$$

In the decarburization process, a heating rate from room temperature to a temperature of the soaking area (a heating rate in the heating area) is preferably 7° C./second or faster on average, and more preferably 9° C./second or faster. If the heating rate is too slow, the decarburization properties deteriorate. Furthermore, it is not necessary to specify an upper limit, but if the heating rate is too fast, it will be difficult to control a soaking temperature.

A temperature of the soaking area and a retention time in the soaking area are preferably 750 to 900° C., and 10 to 600 seconds. If a temperature (an annealing temperature) of the soaking area is lower than 750° C. the decarburization rate decreases and the productivity decreases. On the other hand, if the temperature of the soaking area is higher than 900° C. a primary recrystallization grain size exceeds a desired size and thus the magnetic properties after the final annealing deteriorate. Furthermore, if the retention time is shorter than 10 seconds, decarburization cannot be sufficiently performed. On the other hand, if the retention time is longer than 600 seconds, the productivity decreases.

A nitriding treatment step (S110) may be provided from before the decarburization annealing step (S108) to the start of secondary recrystallization in the final annealing step (S112).

The method for this nitriding treatment is not particularly limited. There are a method to be performed in an atmosphere gas having a nitriding ability such as ammonia, a method in which a nitride having a nitriding ability is added to an annealing separator, and the like.

For example, it is desirable that, in the nitriding treatment step (S110), the nitriding treatment of a manufacturing method of Komatsu et al. in which (Al, Si)N is utilized as a main inhibitor (Japanese Examined Patent Application, Second Publication No. S62-45285 or the like) be used.

In the final annealing step (S112), an annealing separator containing alumina as a main component (containing 50 mass % or more of alumina) is used. It is desirable that the annealing separator contain 5 to 50 mass % of magnesia in addition to alumina. When magnesia is contained, the formation of inclusions such as mullite ($3Al_2O_3 \cdot 2SiO_2$) on the surface of the steel sheet is suppressed and the iron loss is stably improved.

In the final annealing, the above-described annealing separator containing alumina as a main component is applied to the surface of the steel sheet having an oxide layer and dried. After dried, the steel sheet is wound in a coil shape and subjected to final annealing (secondary recrystallization annealing).

When an annealing separator containing alumina ($Al_2O_3$) as a main component is used, even if the steel sheet is subjected to final annealing, it is possible to suppress the formation of a film of an inorganic mineral substance such as forsterite on the surface of the steel sheet.

With regard to the application of the annealing separator, when a decarburized annealed sheet is laminated (coiled), the surface which has been subjected to final annealing can be mirror-finished and iron loss can be significantly reduced by applying an annealing separator containing alumina as a main component which does not easily react with silica in the form of a water slurry, through an electrostatic coating method, or the like.

This laminated decarburized annealed sheet is subjected to the final annealing to occur secondary recrystallization and purification of a nitride, a sulfide, or the like. Performing the secondary recrystallization within a prescribed temperature range using a means such as holding the secondary recrystallization at a constant temperature is effective in increasing a magnetic flux density.

Although the final annealing may be performed, for example, under the conditions that a temperature is raised to 1150 to 1250° C., and annealing is performed for 10 to 30 hours in an atmosphere gas containing hydrogen and nitrogen, when purification or the like of a nitride and a sulfide or the like is performed, after the completion of the secondary recrystallization, it is desirable to perform annealing at a temperature of 1100° C. or higher in 100% hydrogen.

After the final annealing step (S112), in an insulation coating forming step (S114), an insulation coating configured to apply tension to the steel sheet may be formed on the surface of the steel sheet.

Also, if necessary, magnetic domain refinement processing may be performed between the above-described processes through a mechanical method using a tooth profile or the like, a chemical method using etching or the like, laser irradiation, electron beam irradiation, or the like.

As described above, in the decarburization annealing process in which the decarburization annealing is performed in the moist hydrogen atmosphere to remove carbon contained in the steel which has been subjected to cold rolling, the annealing to be performed through the controlling of the atmosphere gas to have the oxidation degree in which the iron-based oxide is not formed is a main characteristic of the method for manufacturing a grain-oriented electrical steel sheet according to the embodiment of the present invention.

Also, in the method for manufacturing a grain-oriented electrical steel sheet according to the above-described embodiment, the nitriding treatment process may be further provided from before the decarburization annealing process to before the secondary recrystallization initiation in the final annealing (for example, within a temperature range of 600 to 1000° C.). To be specific, the nitriding treatment process may be performed independently before the decarburization annealing process, carried out in one or more stages of a heating stage, a soaking stage, and a cooling stage in the decarburization annealing process, carried out independently after a decarburization annealing process, or carried out before the secondary recrystallization initiation in the final annealing process by adding a nitrogen compound to an annealing separator.

The grain-oriented electrical steel sheet obtained through the manufacturing method in the above-described embodiment can be mainly utilized as an iron core of a transformer or other electric devices.

EXAMPLES

Although examples of the present invention will be described below, it is obvious that the conditions adopted in the examples are embodiments in which the feasibility and the effects of the present invention can be confirmed and the present invention is not limited to these embodiments.

The inventors of the present invention considered that the oxide layer formed at an initial stage of decarburization annealing has a significant influence on a subsequent decarburization behavior with respect to the decarburization behavior on the surface of the silicon steel sheet and conducted various experiments associated with this.

The inventors of the present invention have examined about stability of a decarburization reaction in the decarburization annealing step in which decarburization annealing is performed in a moist hydrogen atmosphere to remove carbon contained in steel which has been subjected to cold rolling when Sn or Sb is contained as a component of a silicon steel material and Cr is further contained.

Example 1

A silicon steel slab containing, in terms of mass obtained through casting. Si: 3.3%; Mn: 0.14%; C: 0.05%; S: 0.007%; acid-soluble Al: 0.027%; N: 0.008%; and the remainder: Fe and impurities was heated and then subjected to hot rolling to have a sheet thickness of 2.0 mm. The hot rolled sheet was heated to 1100° C., a temperature of the hot rolled sheet decreased to 900° C., and was held for 30 seconds, and then subjected to one cold rolling to a final sheet thickness of 0.22 mm.

The cold rolled sheet was subjected to decarburization annealing in which an oxidation degree ($P_{H2O}/P_{H2}$) was changed by changing a dew point in an atmosphere gas containing 75% hydrogen and 25% nitrogen and a temperature was raised to 830° C. at a heating rate of 7° C./second and held for 120 seconds. In Example 1, the oxidation degree in the heating area is equal to the oxidation degree in the soaking area.

After that, an amount of nitrogen in the steel was increased to 0.02 mass % in an ammonia gas and an inhibitor was strengthened.

The decarburized annealed sheet was subjected to the final annealing in which an annealing separator (80 mass % of alumina+20 mass % of magnesia) containing alumina as a main component was applied in the form of a water slurry, a temperature was raised to 1200° C. in an atmosphere gas containing 75% hydrogen and 25% nitrogen, the atmosphere gas was changed to a 100% hydrogen atmosphere gas, and then annealing was performed at 1200° C. for 20 hours.

The samples prepared through the above steps were washed with water and then were sheared, were subjected to stress relief annealing, had an insulation coating formed to provide tension to the steel sheet (had a tension coating to be applied), were subjected to laser irradiation, and were subjected to magnetic measurement through an SST method. Table 1 shows the amounts of carbon after the decarburization annealing and the values of iron loss ($W_{17/50}$) obtained through the above magnetic measurement.

TABLE 1

| Sample No. | Oxidation degree of decarburization annealing | Amount of carbon of decarburized sheet (ppm) | Evaluation of amount of carbon | Iron loss ($W_{17/50}$) (W/kg) | Evaluation of iron loss | Comprehensive evaluation |
|---|---|---|---|---|---|---|
| 1 | 0.01 | 66 | B | 0.63 | Ex | B |
| 2 | 0.04 | 57 | B | 0.64 | Ex | B |
| 3 | 0.06 | 45 | B | 0.66 | Ex | B |
| 4 | 0.11 | 38 | B | 0.67 | Ex | B |
| 5 | 0.15 | 31 | B | 0.67 | Ex | B |
| 6 | 0.20 | 19 | Ex | 0.74 | B | G |
| 7 | 0.25 | 7 | Ex | 0.81 | B | G |

In Table 1, "Ex" means an excellent result, "G" means a good range (allowable), and "B" means a bad result.

From Table 1, when annealing was performed in a wet gas (a water vapor-hydrogen-nitrogen mixed gas) atmosphere with an oxidation degree of 0.01 to 0.15, the amount of carbon was reduced to 0.02% or less. Thus, the crystal orientation was not impaired through transformation during final annealing and a good iron loss of 0.70 W/kg or less was obtained. However, since the amount of carbon in the steel was greater than 0.0030% (30 ppm), there is a concern that magnetic aging occur (deterioration of magnetic properties due to aging).

Also, when annealing was performed in a wet gas atmosphere having an oxidation degree of 0.20 or more, the amount of carbon in the steel was 0.0030% or less, but good iron loss is not obtained.

It is considered that the reason why the amount of carbon was not reduced to 0.0030% or less depended on a quality and a morphology of an oxide formed on the surface of the steel sheet in a heating process of decarburization annealing. On the surface subjected to decarburization annealing, generally, a decarburization (oxidation of carbon in the steel) reaction and an oxide formation (oxidation of silicon in the steel) reaction of a silica or the like were competing with the moisture in the atmosphere.

From the results of Example 1, it is considered that, when annealing was performed in an atmosphere gas with a low oxidation degree which does not form iron-based oxides, silica on the surface of the steel sheet was generally generated in the form of a dense film, which inhibits decarburization.

Example 2

Influences of surface-segregation-forming elements and oxide-forming elements on the silica forming reaction were investigated. The results will be shown below as Example 2.

A silicon steel slab containing, in terms of mass % obtained through casting. Si: 3.3%; Mn: 0.14%; C: 0.05%; S: 0.007%; acid-soluble Al: 0.027%; N: 0.008%; Sn: 0.07%; and the remainder: Fe and impurities was heated and then subjected to hot rolling to have a sheet thickness of 2.0 mm. The hot rolled sheet was heated to 1100° C., coded to 900° C., was held for 30 seconds, and then subjected to one cold rolling so that a final sheet thickness was 0.22 mm.

The cold rolled sheet was subjected to decarburization annealing in which an oxidation degree ($P_{H2O}/P_{H2}$) was changed by changing a dew point in an atmosphere gas containing 75% hydrogen and 25% nitrogen and a temperature was raised to 830° C. at a heating rate of 7° C./second and held for 120 seconds. In Example 2, the oxidation degree in the heating area is equal to the oxidation degree in the soaking area.

After that, an amount of nitrogen in the steel was increased to 0.02 mass % (a nitriding treatment) in an ammonia gas to strengthen an inhibitor.

The decarburized annealed sheet was subjected to the final annealing in which an annealing separator (50 mass % of alumina+50 mass % of magnesia) containing alumina as a main component was applied in the form of a water slurry, a temperature was raised to 1200° C. in an atmosphere gas containing 75% hydrogen and 25% nitrogen, the atmosphere gas was changed to a 100% hydrogen atmosphere gas, and then annealing was performed at 1200° C. for 20 hours. The samples prepared through the above steps were washed with water and then were sheared, were subjected to stress relief annealing, had an insulation coating formed to provide tension to the steel sheet (had a tension coating to be applied), were subjected to laser irradiation, and were subjected to magnetic measurement using through an SST method. Table 2 shows the amounts of carbon after the decarburization annealing and the values of iron loss ($W_{17/50}$) obtained through the above magnetic measurement mixed gas) atmosphere with an oxidation degree of 0.01 to 0.15, good iron loss is obtained and the amount of carbon in the steel is 0.0030% or less.

It can be seen from the above experiment that, when an appropriate amount of Sn is contained, the decarburization reaction is promoted when decarburization annealing is performed in an atmosphere gas with a low oxidation degree in which an iron oxide is not formed. Even when Sb is contained, the same effect as that of Sn is obtained and the effect can be arranged with the total amount of Sb and Sn. It is presumed that Sb and Sn are segregation elements and both segregate on the surface of the steel sheet to suppress the diffusion of Si to the surface and suppress the formation of the surface silica film.

Example 3

In Example 3, the stabilization of the decarburization reaction when an appropriate amount of Cr was contained together with Sn and Sb (segregation elements) in Example 2 was investigated.

A silicon steel slab containing, in terms of mass obtained through casting. Si: 3.3%; Mn: 0.14%; C: 0.05%; S: 0.007%; acid-soluble Al: 0.027%; N: 0.008%; Sn: 0.05%; Sb: 0.01%, Cr: 0.12%; and the remainder Fe and impurities was heated and then subjected to hot rolling to have a sheet thickness of 2.0 mm. The hot rolled sheet was heated to 1100° C., was held for 30 seconds, and then subjected to one cold rolling to a final sheet thickness of 0.22 mm.

The cold rolled sheet was subjected to decarburization annealing in which an oxidation degree ($P_{H2O}/P_{H2}$) was changed by changing a dew point in an atmosphere gas containing 75% hydrogen and 25% nitrogen and a temperature was raised to 830° C. at a heating rate of 7° C./second and held at 830° C. for 120 seconds. In Example 3, the oxidation degree in the heating area is equal to the oxidation degree in the soaking area.

After that, an amount of nitrogen in the steel was increased to 0.02 mass % in ammonia gas to strengthen the inhibitor.

The decarburized annealed sheet was subjected to the final annealing in which an annealing separator (70 mass % of alumina+30 mass % of magnesia) containing alumina as a main component was applied in the form of a water slurry, a temperature was raised to 1200° C. in an atmosphere gas containing 75% hydrogen and 25% nitrogen, the atmosphere gas was changed to a 100% hydrogen atmosphere gas, and then annealing was performed at 1200° C. for 20 hours.

TABLE 2

| Sample No. | Oxidation degree of decarburization annealing | Amount of carbon of decarburized sheet (ppm) | Evaluation of amount of carbon | Iron loss ($W_{17/50}$) (W/kg) | Evaluation of iron loss | Comprehensive evaluation |
|---|---|---|---|---|---|---|
| 1 | 0.01 | 43 | B | 0.63 | Ex | G |
| 2 | 0.04 | 26 | Ex | 0.63 | Ex | Ex |
| 3 | 0.06 | 21 | Ex | 0.64 | Ex | Ex |
| 4 | 0.11 | 19 | Ex | 0.65 | Ex | Ex |
| 5 | 0.15 | 16 | Ex | 0.65 | Ex | Ex |
| 6 | 0.20 | 18 | Ex | 0.72 | B | G |
| 7 | 0.25 | 9 | Ex | 0.77 | B | G |

In Table 2, "Ex" means an excellent result, "G" means a good range, and "B" means a bad result.

It can be seen from Table 2 that when annealing was performed in a wet gas (a water vapor-hydrogen-nitrogen The samples prepared through the above steps were washed with water and then were sheared, were subjected to stress relief annealing, had an insulation coating formed to provide tension to the steel sheet (had a tension coating to be applied), were subjected to laser irradiation, and were subjected to magnetic measurement using through an SST method.

Table 3 shows the amounts of carbon after decarburization annealing and a value of iron loss ($W_{17/50}$) obtained through the above magnetic measurement.

TABLE 3

| Sample No. | Oxidation degree of decarburization annealing | Amount of carbon of decarburized sheet (ppm) | Evaluation of amount of carbon | Iron loss ($W_{17/50}$) (W/kg) | Evaluation of iron loss | Comprehensive evaluation |
|---|---|---|---|---|---|---|
| 1 | 0.01 | 18 | Ex | 0.63 | Ex | Ex |
| 2 | 0.04 | 13 | Ex | 0.63 | Ex | Ex |
| 3 | 0.06 | 8 | Ex | 0.62 | Ex | Ex |
| 4 | 0.11 | 3 | Ex | 0.65 | Ex | Ex |
| 5 | 0.15 | 2 | Ex | 0.65 | Ex | Ex |
| 6 | 0.20 | 2 | Ex | 0.70 | Ex | Ex |
| 7 | 0.25 | 2 | Ex | 0.74 | B | G |

In Table 3, "Ex" means an excellent result, "G" means a good range, and "B" means a bad result.

It can be seen from Table 3 that, when annealing was performed in a wet gas (a water vapor-hydrogen-nitrogen mixed gas) atmosphere with an oxidation degree of 0.01 to 0.20, good iron loss is obtained and the amount of carbon in the steel is 0.0030% or less. When Cr is contained, an upper limit of an oxidation degree can be expanded. Unlike Sn and Sb, it is presumed that the contained Cr affects the formation of film-like silica and promotes the decarburization reaction when an oxide is formed in the heating process of decarburization annealing.

Example 4

In Example 4, the stabilization of the decarburization reaction when the oxidation degree in the heating area and the oxidation degree in the soaking area were changed was investigated.

A silicon steel slab containing, in terms of mass % obtained through casting, Si: 3.3%; Mn: 0.14%; C: 0.05%; S: 0.007%; acid-soluble Al: 0.027%; N: 0.008%; Sn: 0.05%; and Sb: 0.01% and the remainder: Fe and impurities was heated and then subjected to hot rolling to have a sheet thickness of 2.0 mm. The hot rolled sheet was subjected to annealing in which the hot rolled sheet was heated to 1120° C., and then cooled to 950° C., and held for 30 seconds, and then subjected to one cold rolling so that a final sheet thickness was 0.22 mm.

The cold rolled sheet was subjected to decarburization annealing in which an oxidation degree ($P_{H2O}/P_{H2}$) was changed by changing a dew point in an atmosphere gas containing 75% hydrogen and 25% nitrogen, a temperature was raised to 830° C. at a heating rate of 7° C./second and held at 830° C. for 120 seconds. In Example 4, the oxidation degree in the soaking area was set to 0.08 and the oxidation degree in the heating area was changed.

After that, an amount of nitrogen in the steel was increased to 0.02 mass % in ammonia gas to strengthen the inhibitor.

The decarburization annealing sheet was subjected to final annealing in which an annealing separator (70 mass % of alumina+30 mass % of magnesia) containing alumina as a main component was applied in the form of a water slurry, a temperature was raised to 1200° C. in an atmosphere gas containing 75% hydrogen and 25% nitrogen, the atmosphere gas was changed to a 100% hydrogen atmosphere gas, and then annealing was performed at 1200° C. for 20 hours.

The samples prepared through the above steps were washed with water and then were sheared, were subjected to stress relief annealing, had an insulation coating formed to provide tension to the steel sheet (had a tension coating to be applied), were subjected to laser irradiation, and were subjected to magnetic measurement through an SST method.

Table 4 shows the amounts of carbon after the decarburization annealing and the values of iron loss ($W_{17/50}$) obtained through the above magnetic measurement.

TABLE 4

| Sample No. | Oxidation degree of decarburization annealing | Amount of carbon of decarburized sheet (ppm) | Evaluation of amount of carbon | Iron loss ($W_{17/50}$) (W/kg) | Evaluation of iron loss | Comprehensive evaluation |
|---|---|---|---|---|---|---|
| 1 | 0.08 | 7 | Ex | 0.63 | Ex | Ex |
| 2 | 0.10 | 2 | Ex | 0.62 | Ex | Ex |
| 3 | 0.15 | 1 | Ex | 0.62 | Ex | Ex |

It can be seen from Table 4 that, when the oxidation degree of a wet gas (a water vapor-hydrogen-nitrogen mixed gas) in the heating area is higher than the oxidation degree (0.08) in the soaking area, an amount of carbon is further reduced and even better iron loss is obtained.

Example 5

Furthermore, the cold rolling process was reviewed. The results will be explained below as Example 5.

A silicon steel slab containing, in terms of mass obtained through casting. Si: 3.2; Mn: 0.1%; C: 0.05%; S: 0.006%; acid-soluble Al: 0.028%; N: 0.008%; Sn: 0.05%; Cr: 0.11%; and the remainder: Fe and impurities was heated and then subjected to hot rolling to have a sheet thickness of 2.6 mm. A part of the hot rolled sheet was annealed (subjected to hot-band annealing) at 1100° C., was subjected to annealing in which cold rolling was performed to have a sheet thickness of 2.0 mm, and was heated to 1120° C., and then was subjected to annealing in which a temperature was cooled to 950° C., and held for 30 seconds (intermediate annealing), and then was subjected to cold rolling to have a final sheet thickness of 0.22 mm (Process A). The remaining hot rolled sheet was subjected to annealing in which cold rolling was performed to have a sheet thickness of 2.0 mm without performing hot-band annealing, was heated to 1120° C., and was subjected to annealing in which a temperature was cooled to 950° C., and held for 30 seconds and then subjected to cold rolling so that a final sheet thickness is 0.22 mm (process B). A cold rolling rate after final annealing was 89% in each case.

The cold rolled sheet was subjected to decarburization annealing in which a temperature was raised to 830° C. at a heating rate of 30° C./second at an oxidation degree ($P_{H2O}/P_{H2}$) of 0.06 in an atmosphere gas containing 75% hydrogen and 25% nitrogen and held for 120 seconds. In Example 5, the oxidation degree in the heating area is equal to the oxidation degree in the soaking area.

After that, an amount of nitrogen in the steel was increased to 0.025 mass % in ammonia gas to strengthen the inhibitor.

The decarburized annealed sheet was subjected to final annealing in which an annealing separator (90 mass % of alumina+10 mass % of magnesia) containing alumina as a main component was applied in the form of a water slurry, a temperature was raised to 1200° C. in an atmosphere gas containing 75% hydrogen and 25% nitrogen, the atmosphere gas was changed to a 100% hydrogen atmosphere gas, and then annealing was performed at 1200° C. for 20 hours.

The samples prepared through the above steps were washed with water and then were sheared, were subjected to stress relief annealing, had an insulation coating formed to provide tension to the steel sheet (had a tension coating to be applied), were subjected to laser irradiation, and were subjected to magnetic measurement through an SST method.

Table 5 shows the amounts of carbon after the decarburization annealing and the values of iron loss ($W_{17/50}$) obtained through the above magnetic measurement.

TABLE 5

| Process | Amount of carbon of decarburized sheet (ppm) | Evaluation of amount of carbon | Iron loss ($W_{17/50}$) (W/kg) | Evaluation of iron loss | Comprehensive evaluation |
|---|---|---|---|---|---|
| A | 13 | Ex | 0.66 | Ex | Ex |
| B | 10 | Ex | 0.65 | Ex | Ex |

In Table 5, "Ex" means an excellent result.

As shown in Table 5, regardless of which step was passed, when the amount of carbon in the steel which has been subjected to decarburization was 0.0030% (30 ppm) or less, good iron loss was obtained.

Example 6

A silicon steel slab containing the components shown in Table 6 and the remainder: Fe and impurities, and obtained by casting was heated and then subjected to hot rolling to have a sheet thickness of 2.3 mm. The hot rolled sheet was subjected to annealing in which a temperature was raised to 1100° C., held for 60 seconds and then was subjected to one cold rolling to have a final sheet thickness of 0.22 mm.

The cold rolled sheet was subjected to decarburization annealing in which a temperature was raised to 830° C. at a heating rate of 30° C./second at an oxidation degree ($P_{H2O}/P_{H2}$) of 0.10 in an atmosphere gas containing 75% hydrogen and 25% nitrogen and the oxidation degree ($P_{H2O}/P_{H2}$) was changed to an oxidation degree ($P_{H2O}/P_{H2}$) of 0.06 and held for 120 seconds.

After that, the amount of nitrogen in the steel was increased to 0.025 mass % in ammonia gas to strengthen the inhibitor.

The decarburized annealed sheet was subjected to the final annealing in which an annealing separator (60 mass % of alumina+40 mass % of magnesia) containing alumina as a main component was applied in the form of a water slurry, a temperature was raised to 1200° C. in an atmosphere gas containing 75% hydrogen and 25% nitrogen, the atmosphere gas was changed to a 100% hydrogen atmosphere gas, and then annealing was performed at 1200° C. for 20 hours. The samples prepared through the above steps were washed with water and then were sheared, were subjected to stress relief annealing, had an insulation coating formed to provide tension to the steel sheet (had a tension coating to be applied), were subjected to laser irradiation, and were subjected to magnetic measurement using through an SST method. Table 6 shows the amounts of carbon after the decarburization annealing and the values of iron loss ($W_{17/50}$) obtained through the above magnetic measurement.

TABLE 6

Mass %: (remainder: Fe and impurities)

| Sample No. | Si | Mn | C | S | Acid-soluble Al | N | Sn | Sb | Cr | Cu | P | Ni | B | V | Nb | Mo | Ti | Bi |
|---|---|---|---|---|---|---|---|---|---|---|---|---|---|---|---|---|---|---|
| 1 | 3.20 | 0.10 | 0.05 | 0.006 | 0.027 | 0.008 | 0.05 | — | — | — | — | — | — | — | — | — | — | — |
| 2 | 3.30 | 0.11 | 0.06 | 0.005 | 0.028 | 0.007 | — | 0.01 | — | — | — | — | — | — | — | — | — | — |
| 3 | 3.20 | 0.10 | 0.05 | 0.006 | 0.027 | 0.008 | 0.05 | 0.01 | — | — | — | — | — | — | — | — | — | — |
| 4 | 3.20 | 0.10 | 0.05 | 0.005 | 0.028 | 0.007 | 0.05 | — | 0.10 | — | — | — | — | — | — | — | — | — |
| 5 | 3.30 | 0.11 | 0.06 | 0.006 | 0.027 | 0.008 | — | 0.01 | 0.10 | — | — | — | — | — | — | — | — | — |
| 6 | 3.20 | 0.10 | 0.05 | 0.006 | 0.027 | 0.008 | 0.05 | 0.01 | 0.10 | — | — | — | — | — | — | — | — | — |
| 7 | 3.20 | 0.10 | 0.05 | 0.006 | 0.027 | 0.008 | 0.05 | 0.01 | 0.02 | — | — | — | — | — | — | — | — | — |
| 8 | 3.20 | 0.10 | 0.05 | 0.006 | 0.027 | 0.008 | 0.05 | 0.01 | 0.50 | — | — | — | — | — | — | — | — | — |
| 9 | 2.70 | 0.12 | 0.05 | 0.005 | 0.028 | 0.008 | 0.04 | — | 0.11 | — | — | — | — | — | — | — | — | — |
| 10 | 3.80 | 0.12 | 0.06 | 0.005 | 0.028 | 0.008 | 0.04 | — | 0.11 | — | — | — | — | — | — | — | — | — |
| 11 | 3.20 | 0.14 | 0.05 | 0.007 | 0.027 | 0.007 | 0.06 | — | 0.12 | — | — | — | — | — | — | — | — | — |
| 12 | 3.20 | 0.45 | 0.05 | 0.007 | 0.027 | 0.007 | 0.06 | — | 0.12 | — | — | — | — | — | — | — | — | — |
| 13 | 3.30 | 0.11 | 0.04 | 0.006 | 0.026 | 0.008 | 0.05 | — | 0.09 | — | — | — | — | — | — | — | — | — |

TABLE 6-continued

| 14 | 3.20 | 0.11 | 0.07 | 0.006 | 0.026 | 0.008 | 0.05 | — | 0.09 | — | — | — | — | — | — | — | — | — |
| 15 | 3.30 | 0.13 | 0.06 | 0.004 | 0.027 | 0.007 | — | 0.02 | 0.12 | — | — | — | — | — | — | — | — | — |
| 16 | 3.20 | 0.13 | 0.05 | 0.015 | 0.027 | 0.007 | — | 0.02 | 0.12 | — | — | — | — | — | — | — | — | — |
| 17 | 3.30 | 0.10 | 0.06 | 0.005 | 0.025 | 0.008 | 0.03 | 0.01 | 0.13 | — | — | — | — | — | — | — | — | — |
| 18 | 3.30 | 0.10 | 0.06 | 0.005 | 0.035 | 0.008 | 0.03 | 0.01 | 0.13 | — | — | — | — | — | — | — | — | — |
| 19 | 3.20 | 0.11 | 0.05 | 0.006 | 0.027 | 0.004 | 0.07 | — | 0.12 | — | — | — | — | — | — | — | — | — |
| 20 | 3.20 | 0.11 | 0.05 | 0.006 | 0.027 | 0.010 | 0.07 | — | 0.12 | — | — | — | — | — | — | — | — | — |
| 21 | 3.30 | 0.12 | 0.06 | 0.005 | 0.029 | 0.008 | 0.05 | — | 0.10 | 0.2 | — | — | — | — | — | — | — | — |
| 22 | 3.20 | 0.11 | 0.05 | 0.006 | 0.027 | 0.008 | 0.05 | — | 0.11 | — | 0.2 | — | — | — | — | — | — | — |
| 23 | 3.20 | 0.14 | 0.06 | 0.006 | 0.026 | 0.008 | — | 0.02 | 0.12 | — | — | 0.3 | — | — | — | — | — | — |
| 24 | 3.30 | 0.11 | 0.05 | 0.005 | 0.027 | 0.008 | — | 0.01 | 0.11 | — | — | — | 0.003 | — | — | — | — | — |
| 25 | 3.20 | 0.10 | 0.05 | 0.006 | 0.025 | 0.009 | 0.03 | 0.01 | 0.12 | — | — | — | — | 0.07 | — | — | — | — |
| 26 | 3.30 | 0.11 | 0.06 | 0.006 | 0.026 | 0.009 | 0.02 | 0.01 | 0.13 | — | — | — | — | — | 0.05 | — | — | — |
| 27 | 3.30 | 0.11 | 0.05 | 0.006 | 0.027 | 0.008 | 0.04 | — | 0.11 | — | — | — | — | — | — | 0.05 | — | — |
| 28 | 3.20 | 0.14 | 0.06 | 0.008 | 0.027 | 0.007 | — | 0.02 | 0.12 | — | — | — | — | — | — | — | 0.005 | — |
| 29 | 3.20 | 0.10 | 0.05 | 0.006 | 0.028 | 0.008 | 0.05 | — | 0.12 | — | — | — | — | — | — | — | — | 0.005 |

(Continuation of table 6)

| Sample No. | Amount of carbon of decarburized sheet (ppm) | Evaluation of amount of carbon | Iron loss ($W_{17/50}$) (W/kg) | Evaluation of iron loss | Comprehensive evaluation |
|---|---|---|---|---|---|
| 1 | 12 | Ex | 0.66 | Ex | Ex |
| 2 | 14 | Ex | 0.66 | Ex | Ex |
| 3 | 11 | Ex | 0.65 | Ex | Ex |
| 4 | 10 | Ex | 0.65 | Ex | Ex |
| 5 | 11 | Ex | 0.64 | Ex | Ex |
| 6 | 8 | Ex | 0.64 | Ex | Ex |
| 7 | 10 | Ex | 0.65 | Ex | Ex |
| 8 | 10 | Ex | 0.65 | Ex | Ex |
| 9 | 8 | Ex | 0.64 | Ex | Ex |
| 10 | 17 | Ex | 0.61 | Ex | Ex |
| 11 | 7 | Ex | 0.65 | Ex | Ex |
| 12 | 8 | Ex | 0.67 | Ex | Ex |
| 13 | 8 | Ex | 0.66 | Ex | Ex |
| 14 | 12 | Ex | 0.69 | Ex | Ex |
| 15 | 9 | Ex | 0.69 | Ex | Ex |
| 16 | 8 | Ex | 0.68 | Ex | Ex |
| 17 | 7 | Ex | 0.67 | Ex | Ex |
| 18 | 9 | Ex | 0.63 | Ex | Ex |
| 19 | 8 | Ex | 0.69 | Ex | Ex |
| 20 | 7 | Ex | 0.63 | Ex | Ex |
| 21 | 8 | Ex | 0.63 | Ex | Ex |
| 22 | 10 | Ex | 0.65 | Ex | Ex |
| 23 | 9 | Ex | 0.64 | Ex | Ex |
| 24 | 7 | Ex | 0.64 | Ex | Ex |
| 25 | 10 | Ex | 0.65 | Ex | Ex |
| 26 | 9 | Ex | 0.63 | E:x | Ex |
| 27 | 8 | Ex | 0.65 | Ex | Ex |
| 28 | 9 | Ex | 0.67 | Ex | Ex |
| 29 | 8 | Ex | 0.64 | Ex | Ex |

As shown in Table 6, regardless of the composition of the silicon steel slab to be used, when the amount of carbon in the steel which has been subjected to decarburization was 0.0030% (30 ppm) or less, good iron loss was obtained.

It can be seen from the above results that a decarburization reaction is stably performed and a product with good iron loss characteristics can be manufactured by promoting smoothing of the surface of the steel sheet when Sn and Sb are contained as components of the silicon steel slab and an appropriate amount of Cr is contained, in the decarburization annealing step of performing decarburization annealing in a moist hydrogen atmosphere to remove carbon contained in the steel which has been subjected to cold rolling.

INDUSTRIAL APPLICABILITY

According to the present invention, it is possible to provide a method for manufacturing a grain-oriented electrical steel sheet having good magnetic properties while satisfactorily performing decarburization in decarburization annealing. Therefore, the present invention has high industrial applicability.

The invention claimed is:

1. A method for manufacturing a grain-oriented electrical steel sheet, comprising:
   a silicon steel material production process of producing a silicon steel material;
   a hot rolling process of obtaining a hot rolled sheet by subjecting the silicon steel material to hot rolling;
   a cold rolling process of obtaining a steel sheet of a final sheet thickness by subjecting the hot rolled sheet to a single cold rolling process or multiple cold rolling processes having intermediate annealing performed between the cold rolling processes;
   a decarburization annealing process of subjecting the steel sheet to decarburization annealing; and
   a final annealing process of applying an annealing separator containing alumina as a main component to the steel sheet and subjecting the steel sheet to final annealing,
   wherein the silicon steel material contains: in terms of mass %,
   Si: 0.8 to 7.0%;
   C: 0.085% or less;

acid-soluble Al: 0.010 to 0.065%;
N: 0.004 to 0.012%;
Mn: 1.00% or less;
S: 0.050% or less;
a total of 0.01 to 0.20% of one or both of Sn and Sb; and
the remainder: Fe and impurities,
wherein the decarburization annealing process includes:
performing the decarburization annealing using a decarburization annealing furnace including a heating area and a soaking area,
an oxidation degree P1 of an atmosphere gas in the heating area satisfies the following Expression 1, and
an oxidation degree P2 of an atmosphere gas in the soaking area satisfies the following Expression 2, and
wherein the P1 and the P2 described above satisfy the following Expression 3:

$$0.01 \leq P1 \leq 0.15 \quad \text{(Expression 1)};$$

$$0.01 \leq P2 \leq 0.15 \quad \text{(Expression 2); and}$$

$$P1 > P2 \quad \text{(Expression 3)}.$$

2. The method for manufacturing a grain-oriented electrical steel sheet according to claim 1, wherein the silicon steel material further contains, in terms of mass %, Cr: 0.02 to 0.50%.

3. The method for manufacturing a grain-oriented electrical steel sheet according to claim 1, wherein the silicon steel material further contains, in terms of mass %,
   Cu: 0% or more and 0.4% or less;
   P: 0% or more and 0.5% or less;
   Ni: 0% or more and 1.0% or less;
   B: 0% or more and 0.008% or less;
   V: 0% or more and 0.15% or less;
   Nb: 0% or more and 0.20% or less;
   Mo: 0% or more and 0.10% or less;
   Ti: 0% or more and 0.015% or less; and
   Bi: 0% or more and 0.010% or less.

4. The method for manufacturing a grain-oriented electrical steel sheet according to claim 1, further comprising:
   a nitriding treatment process from before the decarburization annealing process to before secondary recrystallization initiation in the final annealing process.

5. The method for manufacturing a grain-oriented electrical steel sheet according to claim 1, further comprising:
   a hot-band annealing process of subjecting the hot rolled sheet obtained in the hot rolling process to annealing after the hot rolling process and before the cold rolling process.

6. The method for manufacturing a grain-oriented electrical steel sheet according to claim 2, wherein the silicon steel material further contains, in terms of mass %,
   Cu: 0% or more and 0.4% or less;
   P: 0% or more and 0.5% or less;
   Ni: 0% or more and 1.0% or less;
   B: 0% or more and 0.008% or less;
   V: 0% or more and 0.15% or less;
   Nb: 0% or more and 0.20% or less;
   Mo: 0% or more and 0.10% or less;
   Ti: 0% or more and 0.015% or less; and
   Bi: 0% or more and 0.010% or less.

7. The method for manufacturing a grain-oriented electrical steel sheet according to claim 2, further comprising:
   a nitriding treatment process from before the decarburization annealing process to before secondary recrystallization initiation in the final annealing process.

8. The method for manufacturing a grain-oriented electrical steel sheet according to claim 3, further comprising:
   a nitriding treatment process from before the decarburization annealing process to before secondary recrystallization initiation in the final annealing process.

9. The method for manufacturing a grain-oriented electrical steel sheet according to claim 2, further comprising:
   a hot-band annealing process of subjecting the hot rolled sheet obtained in the hot rolling process to annealing after the hot rolling process and before the cold rolling process.

10. The method for manufacturing a grain-oriented electrical steel sheet according to claim 3, further comprising:
    a hot-band annealing process of subjecting the hot rolled sheet obtained in the hot rolling process to annealing after the hot rolling process and before the cold rolling process.

11. The method for manufacturing a grain-oriented electrical steel sheet according to claim 1, wherein the silicon steel material contains, in terms of mass %, S: 0.020% to 0.050%.

* * * * *